United States Patent
Mine

(10) Patent No.: US 7,385,018 B2
(45) Date of Patent: Jun. 10, 2008

(54) HYDROGENATED COPOLYMER, PROCESS FOR PRODUCING THE SAME, AND HOT-MELT ADHESIVE COMPOSITION CONTAINING THE SAME

(75) Inventor: Toshihiro Mine, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 10/517,608

(22) PCT Filed: Jun. 26, 2002

(86) PCT No.: PCT/JP02/06392

§ 371 (c)(1),
(2), (4) Date: Jun. 6, 2005

(87) PCT Pub. No.: WO2004/003026

PCT Pub. Date: Jan. 8, 2004

(65) Prior Publication Data

US 2006/0041082 A1    Feb. 23, 2006

(51) Int. Cl.
*C08F 212/08* (2006.01)
(52) U.S. Cl. .................. 526/283; 526/280; 526/335; 526/347; 526/347.1
(58) Field of Classification Search ............... 526/280, 526/283, 335, 347, 347.1
See application file for complete search history.

(56) References Cited

U.S. PATENT DOCUMENTS 5,502,140 A    3/1996   Daughenbaugh et al.

FOREIGN PATENT DOCUMENTS

| | | |
|---|---|---|
| EP | 131 460 | 1/1985 |
| EP | 0 149 909 | 7/1985 |
| EP | 666 273 | 8/1995 |
| EP | 0 845 484 | 6/1998 |
| EP | 845 484 | 6/1998 |
| JP | 05-194629 | 8/1993 |
| JP | 06-093015 | 4/1994 |
| JP | 10-176012 | 6/1998 |
| JP | 11-286514 | 10/1999 |
| JP | 11-335645 | 12/1999 |
| WO | 95/12623 | 5/1995 |
| WO | WO 95/12623 A1 * | 5/1995 |

* cited by examiner

*Primary Examiner*—Robert D. Harlan
(74) *Attorney, Agent, or Firm*—Oblon, Spivak, McClelland, Maier & Neustadt, P.C.

(57) ABSTRACT

The present invention involves a hydrogenated copolymer obtained by hydrogenating a copolymer having a softening point falling in a range of 45 to 55° C. determined by a ball & ring method, wherein the hydrogenated copolymer has a softening point of 85 to 95° C. determined by the ball & ring method, and a hot melt adhesive composition comprising this copolymer hydrogenated product. The hydrogenated copolymer of the present invention has a small weight reduction rate in heating and a good hue after heating. The hot melt adhesive composition comprising the same has excellent fluidity in heating and has a small heating loss and a small change in a hue in heating and has excellent heat stability.

9 Claims, No Drawings

HYDROGENATED COPOLYMER, PROCESS FOR PRODUCING THE SAME, AND HOT-MELT ADHESIVE COMPOSITION CONTAINING THE SAME

BACKGROUND OF THE INVENTION

The present invention relates to a hydrogenated copolymer, a production process for the same and a hot melt adhesive composition using the same, more specifically to a hydrogenated copolymer which has a small weight reduction rate in heating and a good hue after heating and has an adhesion-providing property and which is suited as one component for a hot melt adhesive composition, a production process for the same and a hot melt adhesive composition which comprises the hydrogenated copolymer described above and is excellent in a fluidity in heating and which has a small heating loss and a small change in a hue in heating and has an excellent heat stability and a good weatherability.

RELATED ART

In recent years, a hot melt adhesive has been expanding in a use thereof in various fields because it is excellent in a high speed coating property, a rapid curing property, a barrier property, an energy saving property and an economical efficiency. Used as a conventional hot melt adhesive are, for example, compositions prepared by blending adhesion-providing resins and plasticizers with base polymers such as natural rubbers, ethylene-vinyl acetate copolymers, styrene-butadiene-styrene block copolymers and hydrogenated products thereof, styrene-isoprene-styrene block copolymers and hydrogenated products thereof. In general, Used as the adhesion-providing resin described above are petroleum resins, coumarone resins, phenol base resins, terpene base resins, rosin base resins and hydrogenated products thereof.

Such hot melt adhesive has to be applied after molten by heating in using, and therefore products having a large heating loss are likely to damage health of an operator due to white smoke generated in melting by heating. Further, it brings about such unfavorable situations that an adverse effect is exerted on an adhesive performance of the finished product or a fine appearance of the finished product is damaged by a deterioration in the hue after heating.

DISCLOSURE OF THE INVENTION

Under such circumstances, an object of the present invention is to provide a hydrogenated copolymer which has a small weight reduction rate in heating and a good hue after heating and has an adhesion-providing property and which is suited as one component of a hot melt adhesive composition and a hot melt adhesive composition which comprises the above hydrogenated copolymer and is excellent in a fluidity in heating and which has a small heating loss and a small change in a hue in heating and has an excellent heat stability and a good weatherability.

Intensive researches repeated by the present inventors in order to develop a hydrogenated copolymer and a hot melt adhesive composition each having the preferred properties described above have resulted in finding that the above object can be achieved by a hydrogenated copolymer which is obtained by hydrogenating a copolymer having a softening point falling in a specific low range and in which a softening point falls in a specific range. The present invention has been completed based on such knowledge.

That is, the present invention provides:

(1) a hydrogenated copolymer obtained by hydrogenating a copolymer having a softening point falling in a range of 45 to 55° C. determined by a ball & ring method, wherein the hydrogenated copolymer has a softening point of 85 to 95° C. determined by the ball & ring method, (2) the hydrogenated copolymer as described in the above item (1), wherein the copolymer is obtained from cyclopentadiene and/or dicyclopentadiene and a vinyl-substituted aromatic compound, (3) a production process for a hydrogenated copolymer having a softening point of 85 to 95° C. determined by a ball & ring method, characterized by subjecting a copolymer having a softening point falling in a range of 45 to 55° C. determined by the ball & ring method to hydrogenation treatment, (4) the production process for a hydrogenated copolymer as described in the above item (3), wherein the copolymer is obtained from cyclopentadiene and/or dicyclopentadiene and a vinyl-substituted aromatic compound, (5) a hot melt adhesive composition comprising the hydrogenated copolymer as described in the above item (1), (6) the hot melt adhesive composition as described in the above item (5), wherein the copolymer is obtained from cyclopentadiene and/or dicyclopentadiene and a vinyl-substituted aromatic compound, and (7) the hot melt adhesive composition as described in the above item (5) or (6), further comprising a base polymer and a plasticizer.

BEST MODE FOR CARRYING OUT THE INVENTION

In the hydrogenated copolymer of the present invention, a copolymer having a softening point falling in a range of 45 to 55° C. determined by the ball & ring method is used as a copolymer before hydrogenation. In the present invention, a copolymer obtained from cyclopentadiene and/or dicyclopentadiene and a vinyl-substituted aromatic compound can be used as this copolymer.

The softening point determined by the ball & ring method described above shows a softening point obtained by measuring based on JAI 7-1999.

In the copolymer described above, the vinyl-substituted aromatic compound used as one component of the raw material monomers includes, for example, styrene, α-methylstyrene and vinyltoluene, and they may be used alone or in a combination of two of more kinds thereof.

The above copolymer is produced by copolymerizing cyclopentadiene and/or dicyclopentadiene and the vinyl-substituted aromatic compound described above which are the raw material monomers in a suitable solvent. In this case, capable of being preferably used as the solvent are, for example, hydrocarbon compounds such as benzene, toluene, xylene, cyclohexane, dimethylcyclohexane and ethylcyclohexane. They may be used alone or in a combination of two of more kinds thereof. A use amount of this solvent is selected in a range of usually 50 to 500 mass parts, preferably 60 to 300 mass parts per 100 mass parts of the monomers.

Advantageous as the polymerization method is a method in which the solvent described above is heated preferably to 100° C. or higher, more preferably 150° C. or higher to carry out copolymerization while divisionally adding a monomer mixture of cyclopentadiene and/or dicyclopentadiene and the vinyl-substituted aromatic compound to this heated solvent.

A use proportion of cyclopentadiene and/or dicyclopentadiene and the vinyl-substituted aromatic compound shall not specifically be restricted and falls in a range of usually 70:30 to 20:80, preferably 60:40 to 40:60 on a mass basis. The divisionally adding time is usually 0.5 to 5 hours, preferably 1 to 3 hours. The divisional addition is carried out preferably in equal parts.

In this copolymerization reaction, the monomer mixture of cyclopentadiene and/or dicyclopentadiene and the vinyl-substituted aromatic compound is preferably reacted continuously as well after finishing divisionally adding them. In this case, the reaction conditions shall not specifically be restricted. The reaction temperature is usually 200 to 350° C., preferably 250 to 300° C.; the reaction pressure is usually 0 to 2 MPa-G, preferably 0 to 1.5 MPa-G; and the reaction time is usually 0.5 to 8 hours, preferably 1 to 5 hours.

After finishing the reaction, the reaction solution is subjected to treatment for removing volatile matters, for example, at a temperature of 100 to 300° C. and a pressure of 0.1 to 10 kPa for 1 to 3 hours, whereby the intended copolymer is obtained.

In the copolymer thus obtained, the softening point determined by the ball & ring method has to fall in a range of 45 to 55° C., and the vinyl-substituted aromatic compound unit has usually a content of 30 to 90 mass %, a bromine value of 30 to 90 g/100 g and a number average molecular weight of 400 to 1,000. The average molecular weight described above is a value reduced to polystyrene measured by a gel permeation chromatography (GPC) (hereinafter, the same shall apply).

In the present invention, the copolymer thus obtained in which a softening point (ball & ring method) falls in a range of 45 to 55° C. is subjected to hydrogenation treatment, whereby the hydrogenated copolymer of the present invention is produced.

In this hydrogenation reaction, catalysts of nickel, palladium, cobalt, platinum and rhodium bases are used as a catalyst. The copolymer described above is hydrogenated on the conditions of a temperature of 120 to 300° C., preferably 150 to 250° C., a reaction pressure of 1 to 6 MPa·G and a reaction time of 1 to 7 hours, preferably 2 to 5 hours in the presence of the catalyst described above in a suitable solvent, for example, cyclohexane and tetrahydrofuran.

After finishing the reaction, the reaction solution is subjected to treatment for removing volatile matters, for example, at a temperature of 100 to 300° C. and a pressure of 0.1 to 10 kPa for 1 to 3 hours, whereby the hydrogenated copolymer of the present invention is obtained.

In the hydrogenated copolymer of the present invention thus obtained, the softening point determined by the ball & ring method has to fall in a range of 85 to 95° C., and the vinyl-substituted aromatic compound unit has usually a content of 0 to 35 mass %, a bromine value of 0 to 30 g/100 g and a number average molecular weight of 400 to 1,000.

The hydrogenated copolymer of the present invention described above has a small weight reduction rate and a good hue after heating and has an adhesion-providing property, and it is suited as one component of a hot melt adhesive.

Next, the hot melt adhesive composition of the present invention comprises the hydrogenated copolymer of the present invention described above as an essential component and usually further comprises a base polymer and a plasticizer in addition to the above hydrogenated copolymer.

The base polymer described above shall not specifically be restricted, and optional products can be selected from those used as a base polymer in a hot melt adhesive and used. The specific examples of this base polymer include natural rubber, ethylene-vinyl acetate copolymers, amorphous poly-α-olefins, styrene-butadiene-styrene block copolymers (SBS), styrene-isoprene-styrene block copolymers (SIS), and styrene-ethylene-butylene-styrene rubber (SEBS) and styrene-ethylene-propylene-styrene rubber (SEPS) which are obtained by hydrogenating them. They may be used alone or in a combination of two or more kinds thereof.

On the other hand, the plasticizer shall not specifically be restricted, and optional products can be selected from those used as a plasticizer in a hot melt adhesive and used. The specific examples of this plasticizer include paraffin base process oils obtained by subjecting heavy oil fractions obtained by distilling crude oil at an atmospheric pressure to distillation at a reduced pressure and further refining it by hydrogenation reforming and dewaxing treatment, naphthene base process oils obtained by subjecting it to extraction with a solvent, hydrogenation and clay treatment after distillation at a reduced pressure, polybutene and liquid poly-α-olefins. They may be used alone or in a combination of two or more kinds thereof.

A content proportion of the respective components in the hot melt adhesive composition of the present invention is varied depending on the required physical properties. Usually, the hydrogenated copolymer falls in a range of 30 to 70 mass %; the base polymer falls in a range of 15 to 40 mass %; and the plasticizer falls in a range of 10 to 40 mass %.

An antioxidant, a wax and a filler in addition to the hydrogenated copolymer, the base polymer and the plasticizer each described above can be added, if necessary, to the hot melt adhesive composition of the present invention as long as the required physical properties are not damaged.

A method for preparing the hot melt adhesive composition of the present invention shall not specifically be restricted, and capable of being used is, for example, a method in which the respective components are heated, molten and mixed or kneaded by means of a propeller type stirrer, a double shaft blender and a kneader. A blending order of the respective components shall not specifically be restricted. Further, the heating temperature shall not specifically be restricted as well, and heating, melting and mixing or kneading are carried out usually at a temperature of 120 to 190° C.

The hot melt adhesive composition of the present invention thus obtained has an excellent fluidity in heating, a small heating loss and heat hue change and an excellent heat stability and has a good weatherability, and it can be used in various fields such as, for example, sanitary materials, packaging, book-binding, non-woven materials, wood working, electric materials, can working, building, bag working and binders for a road.

Next, the present invention shall be explained in further details with reference to examples, but the present invention shall by no means be restricted by these examples.

The physical properties of the copolymers and the hydrogenated copolymers and the performances of the hot melt adhesive composition were evaluated according to methods shown below.

<Physical Properties of the Copolymers and the Hydrogenated Copolymers>

(1) Softening Point

Measured by the ball & ring method according to JAI 7-1999.

(2) Styrene Unit Content

Determined by means of an infrared spectrophotometer (absorbance in a wavelength of 700 $cm^{-1}$).

(3) Bromine Value

Measured according to JIS K 2605.

<Physical Properties of Hydrogenated Copolymers>
(4) Heating Loss

The hydrogenated copolymer 2 g was put on an aluminum-made Petri dish and heated at 180° C. for one hour to measure a heating loss, and the heating loss was determined according to the following equation:

heating loss (%)=[(weight before heating−weight after heating)/(weight before heating)]×100

(5) Heating Hue

The hydrogenated copolymer 20 g was put in a glass bottle and heated at 180° C. for 48 hours, and it was then dissolved in toluene to determine a Gardner hue according to JIS K 6901.

<Performances of the Hot Melt Adhesive Composition>
(6) Heating Loss and Heating Hue Measured in the same manners as in (4) and (5) described above.
(7) Softening Point Measured according to JIS K 2207.
(8) Melt Viscosity Measured according to JIS K 6862 by means of a B type viscometer.
(9) Adhesive Strength Measured according to JIS Z 0237.
(10) Loop Tack Measured according to a FINAT test standard.
(11) Holding Power Measured according to JIS Z 0237.

PRODUCTION EXAMPLE 1

A one liter polymerization reactor equipped with a stirrer which was substituted with nitrogen was charged with 382 g of xylene and heated up to 260° C., and a mixture of 159 g of dicyclopentadiene and 159 g of styrene was added thereto in 120 minutes while stirring. Then, the copolymerization reaction was continued for 110 minutes.

After finishing the reaction, the reaction solution was taken out and treated at a temperature of 200° C. and a pressure of 1.3 kPa for 2 hours by means of a rotary evaporator to remove the unreacted monomers and xylene to obtain 287 g of a copolymer of cyclopentadiene and styrene. The physical properties of this copolymer are shown in Table 1.

PRODUCTION EXAMPLE 2

A copolymer was obtained in the same manner as in Production Example 1, except that in Production Example 1, the copolymerization reaction was continued for 130 minutes after the monomer mixture was added. The physical properties of this copolymer are shown in Table 1.

EXAMPLE 1

A 300 ml reactor equipped with a stirrer which was substituted with nitrogen was charged with 70 g of cyclohexane, 70 g of the copolymer obtained in Production Example 1 and 1.5 g of a nickel base catalyst to carry out hydrogenation reaction at a hydrogen pressure of 4 MPa and a temperature of 230° C. for 4 hours.

After finishing the reaction, the reaction solution was taken out, and 4,000 PPM of an antioxidant (brand name "Irganox 1010", manufactured by Ciba Specialty Chemicals Co., Ltd.) was added thereto. Then, the solution was treated at a temperature of 200° C. and a pressure of 670 Pa for 3 hours by means of a rotary evaporator to remove cyclohexane, whereby 70 g of a hydrogenated copolymer of cyclopentadiene and styrene was obtained. The physical properties of this hydrogenated copolymer are shown in Table 1.

COMPARATIVE EXAMPLE 1

Hydrogenation reaction was carried out in the same manner as in Example 1, except that in Example 1, the copolymer obtained in Production Example 2 was substituted for the copolymer obtained in Production Example 1.

After finishing the reaction, the reaction solution was taken out, and 4,000 PPM of the antioxidant (brand name "Irganox 1010", manufactured by Ciba Specialty Chemicals Co., Ltd.) was added thereto. Then, the solution was treated at a temperature of 200° C. and a pressure of 1.3 kPa for one hour by means of a rotary evaporator to remove cyclohexane, whereby 70 g of a hydrogenated copolymer of cyclopentadiene and styrene was obtained. The physical properties of this hydrogenated copolymer are shown in Table 1.

TABLE 1

|  | Production Example | | Example 1 | Comparative Example 1 |
| --- | --- | --- | --- | --- |
|  | 1 | 2 | | |
| Softening point (° C.) | 50 | 60 | 91 | 90 |
| Styrene unit content (mass %) | 48 | 47 | 2 | 2 |
| Bromine value (g/100 g) | 55 | 55 | 3 | 3 |
| Heating hue (Gardner) | — | — | 4 | 7 |
| Heating loss (mass %) | — | — | 6.3 | 9.6 |

As shown in Table 1, while the copolymer obtained in Production Example 1 had a softening point of 50° C., the hydrogenated copolymer obtained in Example 1 had a softening point of 91° C. Further, the hydrogenated product obtained in Example 1 had a heating loss of 6.3 mass % when heated at 180° C. for one hour and a Gardner hue of 4 when heated at 180° C. for 48 hours.

In contrast with this, the copolymer obtained in Production Example 2 had a softening point of 60° C., and the hydrogenated copolymer obtained in Comparative Example 1 had a softening point of 90° C. Further, the hydrogenated product obtained in Comparative Example 1 had a heating loss of 9.6 mass % when heated at 180° C. for one hour and a Gardner hue of 7 when heated at 180° C. for 48 hours.

As shown above, the hydrogenated copolymer obtained in Example 1 had a smaller heating loss and a better hue after heating than those of the hydrogenated copolymer obtained in Comparative Example 1.

EXAMPLE 2

Used in a proportion shown in Table 2 were the hydrogenated copolymer obtained in Example 1, an SEBS copolymer (brand name "Craton G1652", manufactured by Shell Japan Co., Ltd.; styrene component/rubber component mass ratio=29/71), an oil (brand name "PS-32", manufactured by Idemitsu Kosan Co., Ltd.) and an antioxidant (brand name "Irganox 1010", manufactured by Ciba Specialty Chemicals Co., Ltd.). They were blended at 140° C. for 40 minutes by means of a kneading machine Lab Plast Mill to prepare a hot melt adhesive composition and evaluate the performances thereof. The results thereof are shown in Table 2.

COMPARATIVE EXAMPLE 2

A hot melt adhesive composition was prepared in the same manner as in Example 2, except that in Example 2, the hydrogenated product obtained in Comparative Example 1 was substituted for the hydrogenated product obtained in Example 1 to evaluate the performances thereof. The results thereof are shown in Table 2.

TABLE 2

| | | Example 2 | Comparative Example 2 |
|---|---|---|---|
| Blend ratio (mass part) | SEBS (Craton G1652) | 20 | 20 |
| | Hydrogenated copolymer of Example 1 | 60 | — |
| | Hydrogenated copolymer of Comparative Example 1 | — | 60 |
| | Oil (PS-32) | 20 | 20 |
| | Antioxidant (Irganox 1010) | 1 | 1 |
| Performance | Softening point (° C.) | 82 | 82 |
| | Melt viscosity [160° C.] (mPa · s) | 2400 | 2480 |
| | Adhesive strength [23° C.] (N/cm) | 8.5 | 8.6 |
| | Loop tack [23° C.] (N/cm) | 5.4 | 5.3 |
| | Holding power [50° C.] (mm/h) | 0.8 | 0.7 |
| | Heating hue [Gardner] | 6 | 8 |
| | Heating loss (mass %) | 2.1 | 3.6 |

According to Table 2, the hot melt adhesive composition prepared in Example 2 was almost equal to the hot melt adhesive composition prepared in Comparative Example 2 in terms of an adhesive strength, a loop tack and a holding power but improved in a loss and a hue in heating.

INDUSTRIAL APPLICABILITY

According to the present invention, capable of being provided is a hydrogenated copolymer which has a small weight reduction rate in heating and a good hue after heating and which has an adhesion-providing property and is suited as one component of a hot melt adhesive composition.

Further, the hot melt adhesive composition of the present invention comprising the hydrogenated copolymer described above is excellent in a fluidity in heating and has a small heating loss and a small change in a hue in heating, and it is excellent in a heat stability and has a good weatherability.

What is claimed is:

1. A hydrogenated copolymer obtained by hydrogenating a copolymer of cyclopentadiene and/or dicyclopentadiene with a vinyl-substituted aromatic compound in a mixing ratio of cyclopentadiene and/or dicyclopentadiene to vinyl-substituted aromatic compound of from 70:30 to 20:80 by weight, and having a softening point falling in a range of 45 to 55° C. determined by a ball & ring method, wherein the hydrogenated copolymer has a softening point of 85 to 95° C. determined by the ball & ring method.

2. A production process for hydrogenating a copolymer of cyclopentadiene and/or dicyclopentadiene and a vinyl-substituted aromatic compound in a mixing ratio of cyclopentadiene and/or dicyclopentadiene to vinyl-substituted aromatic compound of from 70:30 to 20:80 by weight, said hydrogenated copolymer having a softening point of 85 to 95° C. determined by a ball & ring method, comprising hydrogenating said copolymer, which has a softening point falling in a range of 45 to 55° C. determined by the ball & ring method.

3. A hot melt adhesive composition comprising the hydrogenated copolymer as described in claim 1.

4. The hot melt adhesive composition as described in claim 3, further comprising a base polymer and a plasticizer.

5. The hydrogenated copolymer of claim 1, wherein the copolymer is obtained from dicyclopentadiene and styrene.

6. The production process of claim 2, wherein the copolymer is obtained from dicyclopentadiene and styrene.

7. The hot melt adhesive composition according to claim 3, wherein the copolymer is obtained from dicyclopentadiene and styrene.

8. The hydrogenated copolymer of claim 1, which copolymer, prior to hydrogenating, has a vinyl-substituted aromatic compound unit content of 30 to 90 mass %, a bromine value of 30 to 90 g/100 g, and a number average molecular weight of 400 to 1000.

9. The hydrogenated copolymer of claim 1, which hydrogenated copolymer has a vinyl-substituted aromatic compound unit content of 0 to 35 mass %, a bromine value of 0 to 30 g/100 g, and a number average molecular weight of 400 to 1000.

* * * * *